(12) United States Patent
Bezault

(10) Patent No.: US 11,518,655 B2
(45) Date of Patent: Dec. 6, 2022

(54) ELEVATOR COMPONENT INSPECTION SYSTEMS

(71) Applicant: Otis Elevator Company, Farmington, CT (US)

(72) Inventor: Quentin Bezault, Gien (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 742 days.

(21) Appl. No.: 16/508,965

(22) Filed: Jul. 11, 2019

(65) Prior Publication Data

US 2020/0031627 A1    Jan. 30, 2020

(30) Foreign Application Priority Data

Jul. 26, 2018   (EP) ..................................... 18306009

(51) Int. Cl.
  *B66B 13/20* (2006.01)
  *B66B 13/22* (2006.01)
  (Continued)

(52) U.S. Cl.
  CPC ............ *B66B 13/20* (2013.01); *B66B 5/0012* (2013.01); *B66B 5/0087* (2013.01); *B66B 13/22* (2013.01); *H04N 7/183* (2013.01)

(58) Field of Classification Search
  CPC ..... B66B 13/20; B66B 5/0012; B66B 5/0087; B66B 13/22; B66B 13/06; B66B 13/143;
  (Continued)

(56) References Cited

U.S. PATENT DOCUMENTS

| 5,644,111 A | 7/1997 | Cerny et al. |
| 6,854,565 B2 | 2/2005 | Peräläet et al. |

(Continued)

FOREIGN PATENT DOCUMENTS

| CN | 1964911 A | 5/2007 |
| CN | 103231958 B | 1/2016 |

(Continued)

OTHER PUBLICATIONS

European Office Action for European Application No. 18306009.4, International Filing Date Jul. 26, 2018, dated Sep. 22, 2020, 6 pages.

(Continued)

*Primary Examiner* — Jeffrey Donels
(74) *Attorney, Agent, or Firm* — Cantor Colburn LLP

(57) ABSTRACT

Elevator systems and methods are provided. The systems include an elevator car including an elevator car door interlock device operable to open and close elevator car doors and a plurality of landing doors located at landings, each landing door including a landing door interlock device operable to open and close a respective landing door. Each landing door interlock device is engageable by the elevator car door interlock device to operate the elevator doors. An elevator component inspection system having a detector to monitor the interlock devices obtains inspection data associated with the interlock devices. A control unit is configured to analyze the inspection data. The component inspection system captures images of the interlock devices using the detector, performs a database inquiry comparing the captured image against a database of interlock device states, and determines a state of the interlock devices.

20 Claims, 8 Drawing Sheets

(51) Int. Cl.
  *H04N 7/18* (2006.01)
  *B66B 5/00* (2006.01)

(58) Field of Classification Search
  CPC ....... B66B 5/0025; B66B 5/0018; B66B 5/02; B66B 13/18; H04N 7/183
  See application file for complete search history.

(56) References Cited

U.S. PATENT DOCUMENTS

| | | |
|---|---|---|
| 6,863,161 B2 | 3/2005 | Mearns et al. |
| 6,973,998 B2 | 12/2005 | Deplazes et al. |
| 7,002,462 B2 | 2/2006 | Welch |
| 7,063,189 B2 | 6/2006 | Curzon et al. |
| 7,073,633 B2 | 7/2006 | Weinberger et al. |
| 7,165,655 B2 | 1/2007 | Cook et al. |
| 7,448,473 B2 | 11/2008 | Lindberg et al. |
| 8,540,057 B2 | 9/2013 | Schuster et al. |
| 8,660,700 B2 | 2/2014 | Jia et al. |
| 9,591,267 B2 | 3/2017 | Lipton et al. |
| 2012/0006629 A1 | 1/2012 | Heath et al. |
| 2016/0368734 A1 | 12/2016 | Zhao et al. |
| 2017/0197808 A1 | 7/2017 | Kimura |
| 2018/0327221 A1* | 11/2018 | Sudi ...................... B66B 1/3492 |
| 2018/0346286 A1* | 12/2018 | Fauconnet .............. G06T 7/001 |
| 2019/0016561 A1* | 1/2019 | Fauconnet ................ B66B 9/00 |
| 2019/0062119 A1* | 2/2019 | Fauconnet .......... B66B 11/0246 |
| 2020/0031619 A1* | 1/2020 | Sudi ...................... B66B 1/3461 |

FOREIGN PATENT DOCUMENTS

| | | |
|---|---|---|
| CN | 106044432 A | 10/2016 |
| CN | 106219341 A | 12/2016 |
| CN | 106219367 A | 12/2016 |
| CN | 106892310 A | 6/2017 |
| CN | 107187980 A | 9/2017 |
| CN | 107683252 A | 2/2018 |
| CN | 107848763 A | 3/2018 |
| CN | 108238519 A | 7/2018 |
| EP | 3296245 A1 | 3/2018 |
| JP | H11349262 A | 12/1999 |
| JP | 2010260648 A | 11/2010 |
| JP | 2011011872 A | 1/2011 |
| JP | 2014076871 A | 5/2014 |
| JP | 2017095226 A | 6/2017 |
| JP | 2017114646 A | 6/2017 |
| JP | 2018104142 A | 7/2018 |

OTHER PUBLICATIONS

European Search Report for European Application No. 18306009.4, International Filing Date Jul. 26, 2018, dated Jan. 4, 2019, 5 pages.

* cited by examiner

ELEVATOR COMPONENT INSPECTION SYSTEMS

CROSS REFERENCE TO RELATED APPLICATIONS

This application claims the benefit of European Application No. 18306009.4, filed Jul. 26, 2018, which is incorporated herein by reference in its entirety.

BACKGROUND

The subject matter disclosed herein generally relates to elevator systems and, more particularly, elevator component inspection systems.

Elevator systems include elevators cars that are moveable within an elevator shaft between different landings or floors of a building. When an elevator car is located at a landing, part of the elevator car will typically engage with a landing door mechanism to enable operation of the landing doors. For example, an elevator car may include an elevator car door interlock device and each landing may have a landing door interlock device. During operation the elevator car door interlock device must be able to move through the elevator shaft without contacting the landing door interlock devices. Further, sufficient contact between the interlock devices is important to ensure proper operation of the elevator doors. Inspection of clearances, spacing, contact areas, etc. that are associated with the interlock devices takes time. Accordingly, improved means for inspection of such interlock devices may be beneficial.

SUMMARY

According to some embodiments, elevator systems are provided. The elevator systems include an elevator car movable within an elevator shaft, the elevator car includes an elevator car door interlock device arranged on a top of the elevator car and operable to open and close elevator car doors, a plurality of landing doors located at respective landings along the elevator shaft, wherein each landing door includes a landing door interlock device operable to open and close a respective landing door, wherein each landing door interlock device is engageable by the elevator car door interlock device to enable operation of the elevator car doors and the respective landing door simultaneously, and an elevator component inspection system comprising a detector located on the top of the elevator car and arranged to monitor the elevator car door interlock device and the plurality of landing door interlock devices, wherein the detector obtains inspection data associated with the elevator car door interlock device and the plurality of landing door interlock devices, and a control unit configured to analyze the inspection data. The component inspection system captures images of the elevator car door interlock device and landing door interlock device using the detector, performs a database inquiry comparing the captured image against a database of interlock device states, and determines a state of the elevator car door interlock device and landing door interlock device.

In addition to one or more of the features described above, or as an alternative, further embodiments of the elevator systems may include that the control unit performs machine learning to learn one or more thresholds.

In addition to one or more of the features described above, or as an alternative, further embodiments of the elevator systems may include that the threshold comprises a minimum area of contact between the landing door interlock device and at least one landing door interlock device, and wherein the threshold is exceeded when the inspection data indicates that less than the minimum area of contact is made between the landing door interlock device and the at least one landing door interlock device, in particular, wherein the minimum area of contact is at least 50% of the elevator car door interlock device is contacted by a respective element of the landing door interlock device.

In addition to one or more of the features described above, or as an alternative, further embodiments of the elevator systems may include that the threshold comprises a minimum clearance gap between the landing door interlock device and at least one landing door interlock device, and wherein the threshold is exceeded when the inspection data indicates that a detected clearance gap exceeds the minimum clearance gap, particularly, wherein the minimum clearance gap is a spacing between 1 and 4 mm.

In addition to one or more of the features described above, or as an alternative, further embodiments of the elevator systems may include that the threshold comprises a detected presence of a marker when the landing door interlock device and at least one landing door interlock device are in a closed position, and wherein the threshold is exceeded when the presence of the marker is detected.

In addition to one or more of the features described above, or as an alternative, further embodiments of the elevator systems may include that each landing door interlock device comprises a pair of rollers and the elevator car door interlock device comprises at least one of a set of vanes and a set of blades.

In addition to one or more of the features described above, or as an alternative, further embodiments of the elevator systems may include transmitting the state of the interlock devices to a remote computing system.

According to some embodiments, methods for inspecting components elevator systems are provided. The methods include performing machine learning to program a control unit to detect one or more thresholds of operation of an elevator door interlock, initiating a door interlock check sequence of an elevator system having an elevator car movable within an elevator shaft, the elevator car includes an elevator car door interlock device arranged on a top of the elevator car and operable to open and close elevator car doors and a plurality of landing doors located at respective landings along the elevator shaft, wherein each landing door includes a landing door interlock device operable to open and close a respective landing door, wherein each landing door interlock device is engageable by the elevator car door interlock device to enable operation of the elevator car doors and the respective landing door simultaneously, performing an inspection sequence with an elevator component inspection system comprising a detector located on the top of the elevator car and arranged to monitor the elevator car door interlock device and the plurality of landing door interlock devices, capturing inspection data with the detector, the inspection data associated with the elevator car door interlock device and the plurality of landing door interlock devices, and comparing, with the control unit, the inspection data against predetermined data to determine when at least one threshold is exceeded.

In addition to one or more of the features described above, or as an alternative, further embodiments of the methods may include analyzing the inspection data, determining if the inspection data indicates a threshold is exceeded, and generating a notification when a threshold is exceeded.

In addition to one or more of the features described above, or as an alternative, further embodiments of the methods may include that one threshold comprises a minimum area of contact between the landing door interlock device and at least one landing door interlock device, and wherein the threshold is exceeded when the inspection data indicates that less than the minimum area of contact is made between the landing door interlock device and the at least one landing door interlock device, particularly, wherein the minimum area of contact is at least 50% of the elevator car door interlock device is contacted by a respective element of the landing door interlock device.

In addition to one or more of the features described above, or as an alternative, further embodiments of the methods may include that one threshold comprises a minimum clearance gap between the landing door interlock device and at least one landing door interlock device, and wherein the threshold is exceeded when the inspection data indicates that a detected clearance gap exceeds the minimum clearance gap, particularly, wherein the minimum clearance gap is a spacing between 1 and 4 mm.

In addition to one or more of the features described above, or as an alternative, further embodiments of the methods may include detecting a marker, wherein the inspection data comprises a detected presence of the marker when the landing door interlock device and at least one landing door interlock device are in a closed position, and wherein the threshold is exceeded when the presence of the marker is detected.

In addition to one or more of the features described above, or as an alternative, further embodiments of the methods may include generating a interlock device state database and querying the interlock device state database to determine if a threshold is exceeded.

In addition to one or more of the features described above, or as an alternative, further embodiments of the methods may include transmitting the inspection data to at least one of a mobile device, a remote device, a distributed computing system, and an elevator controller.

In addition to one or more of the features described above, or as an alternative, further embodiments of the methods may include processing the inspection data on the at least one of a mobile device, a remote device, a distributed computing system, and an elevator controller.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
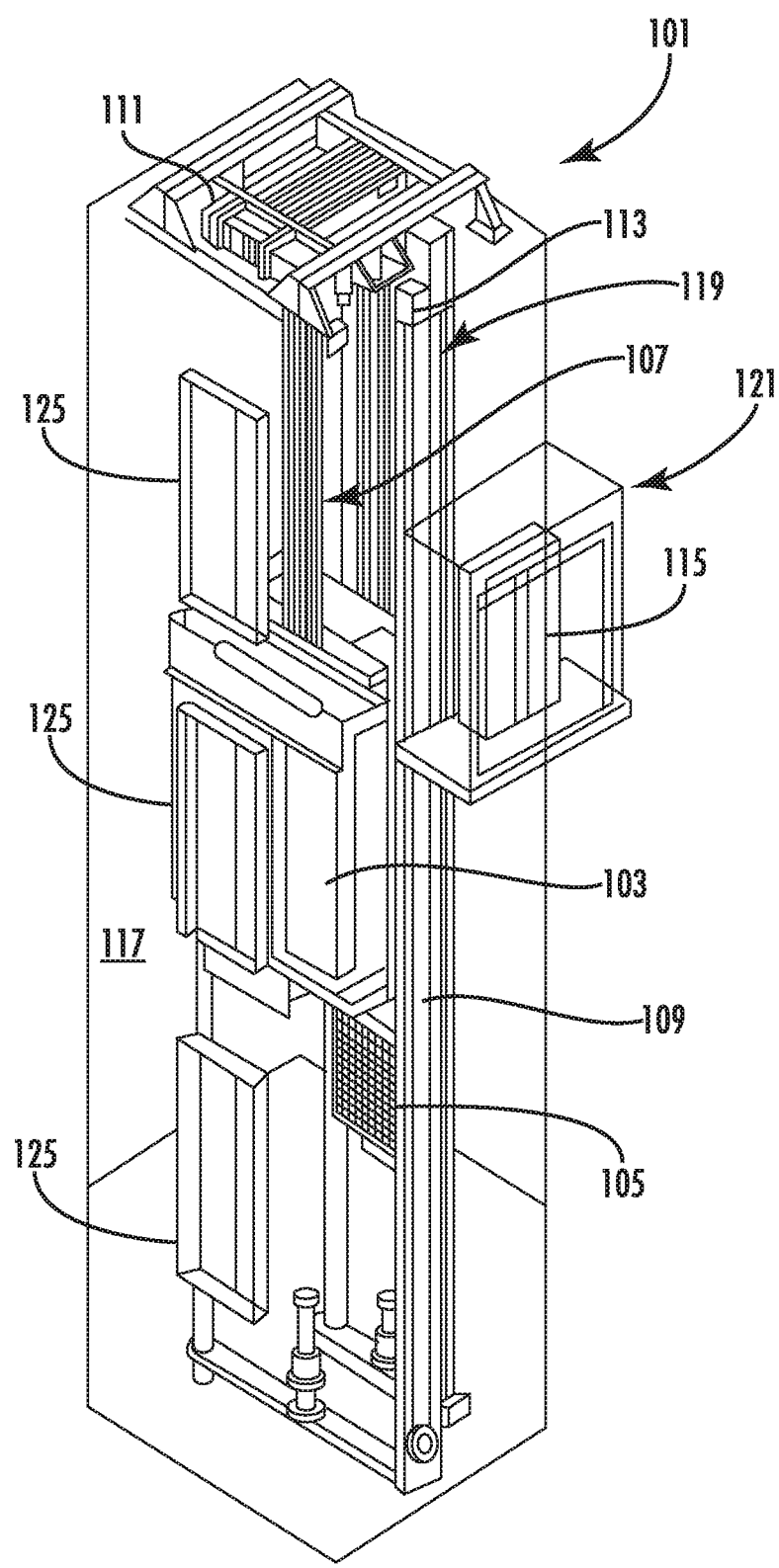
FIG. 1 is a schematic illustration of an elevator system that may employ various embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud (i.e., distributed computing network).

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
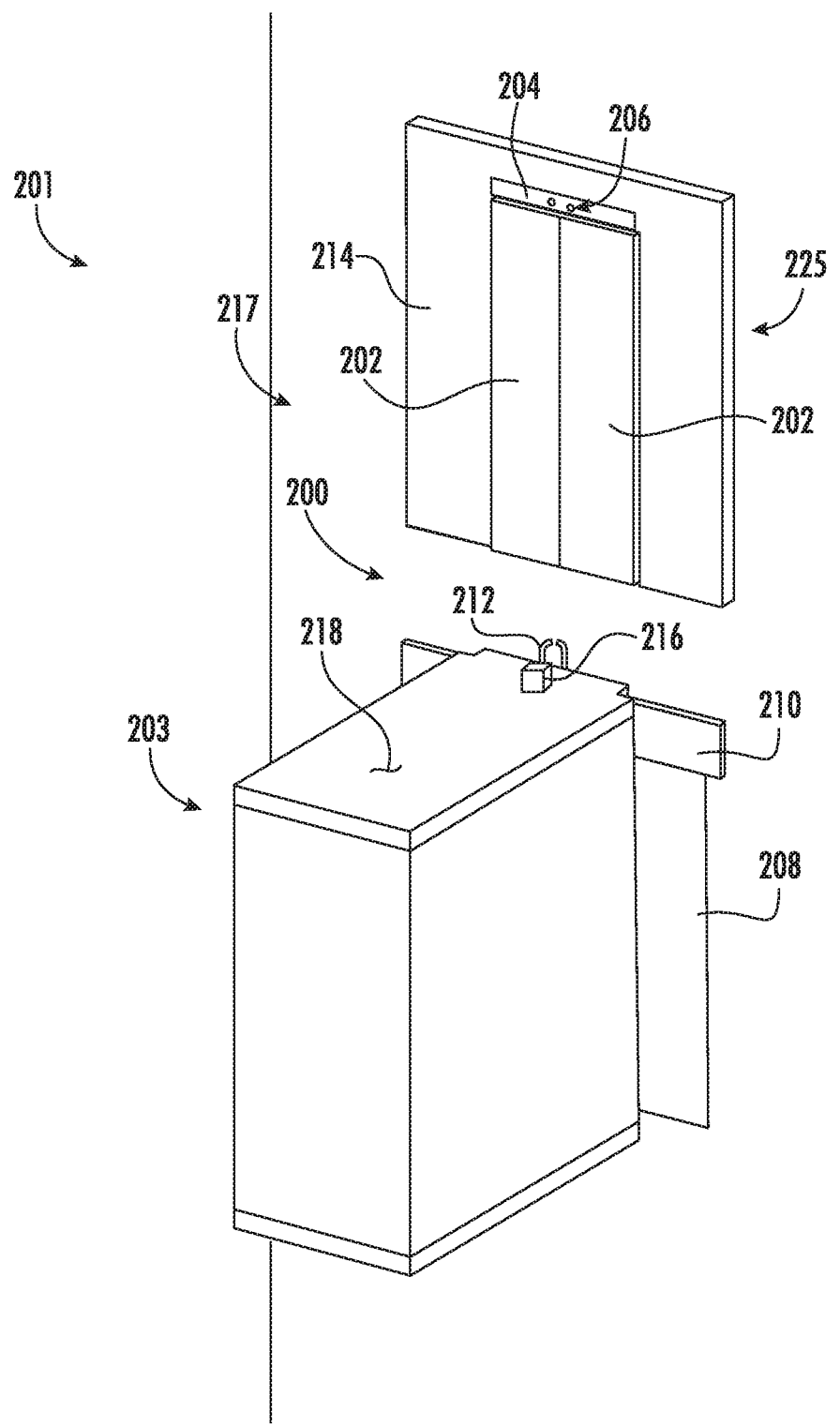
FIG. 2 is a schematic illustration of an elevator car having component inspection system in accordance with an embodiment of the present disclosure.

Turning now to FIG. 2, a schematic illustration of a component inspection system 200 of an elevator system 201 in accordance with an embodiment of the present disclosure is shown. FIG. 2 schematically illustrates an elevator car 203 and a landing 225 having landing doors 202 within an elevator shaft 217. The landing 225 includes a landing door lintel 204 that includes one or more components, including a landing door interlock device 206 (e.g., rollers) arranged for enabling engagement and operation of the landing doors 202. The elevator car 203 has elevator car doors 208 and a car lintel 210, which includes an elevator car door interlock device 212 (e.g., blades/vanes) arranged for enabling engagement and operation of the elevator car doors 208.

When the elevator car 203 is located adjacent to the landing doors 202, the car lintel 210 aligns with a portion of the landing door lintel 204 such that the elevator car door interlock device 212 aligns with the landing door interlock device 206. When aligned, the interlock devices 206, 212 can operate together to allow opening of both the landing doors 202 and the elevator car doors 208. The landing lintel 204 includes a landing door sill having a track and enables the landing doors 202 to open and close within or along a landing door frame 214, as will be appreciated by those of skill in the art. In operation, the elevator car door interlock device 212 engages with and unlocks a landing door lock and engages with the landing door interlock device 206 to operate the landing doors 202 to open when the elevator car doors 208 open. To ensure proper engagement between the elevator car 203 (and components thereof) and the landing 225 (and components thereof), the elevator car 203 must be properly and accurately positioned within an elevator shaft and relative to the landing 225. Further, sufficient engagement between interlock devices 206, 212 is important to ensure proper operation of the elevator doors (e.g., contact surface and/or spacing between components).

To inspect and/or monitor the interlock devices 206, 212 of the elevator system 201, the landing position inspection system 200, in accordance with embodiments of the present disclosure, includes a detector 216 positioned on a top 218 of the elevator car 203. As mounted on the top 218 of the elevator car 203, the detector 216 is arranged to have direct line of sight to the interlock devices 206, 212. Specifically, because the detector 216 is mounted on the top 218 of the elevator car 203, the detector 216 is arranged to view, observe, or otherwise monitor the elevator car door interlock device 212 at all times. In contrast, the detector 216 will view, observe, or otherwise monitor a given landing door interlock device 206 (e.g., of a given landing along the elevator shaft 217) only when the elevator car 203 is adjacent the respective landing 225.

The detector 216 is arranged to monitor an interaction between the interlock devices 206, 212 at each landing 225 of the elevator shaft 217. The monitoring is performed to ensure proper engagement between the interlock devices 206, 212 during operation of the elevator system doors 202, 208. The detector 216 may be a camera or other visual/optical detector, including, but not limited to laser scanners, 2-D depth sensors, 3-D imagers, etc., that can detect and measure a feature within the elevator shaft, and, particularly, a feature of one or more of the interlock devices 206, 212. In some embodiments, as the elevator car 203 approaches the landing 225, the detector 216 can capture one or more images or video of the interlock devices 206, 212. Further, the detector 216 can capture one or more images or video as the interlock devices 206, 212 interact during an opening and/or closing operation of the elevator system doors 202, 208.

Figure 3A:
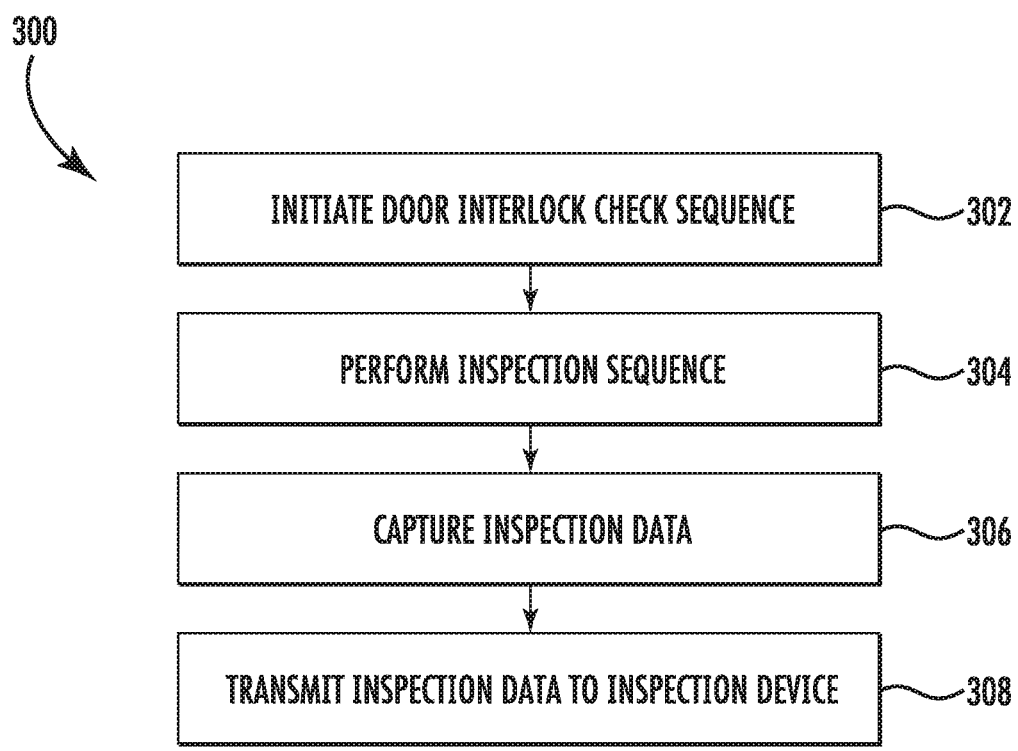
FIG. 3A is a flow process for performing inspection of interlock devices of an elevator system in accordance with an embodiment of the present disclosure.

Turning now to FIG. 3A, a flow process 300 for performing inspection of interlock devices of an elevator system in accordance with an embodiment of the present disclosure is shown. The flow process 300 may be performed with elevator systems as shown and described above, or variations thereon. The elevator system that may be operated in accordance with flow process 300 includes a detector arranged to monitor interlock devices of an elevator car and interlock devices at landings along an elevator shaft of the elevator system. In some embodiments, the flow process 300 may be performed partly or completely through a distributed computing network that is in communication with an elevator system. In some embodiments, a mobile device and/or mobile phone may be used to communicate through the distributed computing network to initiate and/or perform the various aspects of the flow process 300. In other embodiments, a mobile device and/or mobile phone may be used to communicate directly with an elevator system and/or elevator controller to perform embodiments or parts thereof, as described herein. In other embodiments, the flow process 300 may be performed onsite and as part of a maintenance routine or other programming or applications associated with an elevator system. Thus, the presently described flow process 300 is not limited to one specific application or method of execution, as will be appreciated by those of skill in the art.

At block 302, a door interlock check sequence may be initiated. The initiation of the door interlock check sequence may be performed at any number of locations/devices and typically would be initiated by a user (e.g., mechanic) although automated initiation may be implemented in accordance with some embodiments. In some non-limiting examples, a user may initiate the door interlock check sequence from a handheld device (e.g., mobile phone, tablet, dedicated handheld device, etc.) that can transmit a signal or instruction to an elevator controller to perform the door interlock check sequence. In some embodiments, the initiation may be started from an on-site, or off-site, computer system. Further, as noted, in some embodiments, the elevator controller, or an associated computing system, may be configured to initiate the door interlock check sequence based on a schedule, specific event, or based on some other criteria (e.g., maintenance is performed on the interlock devices, light conditions within the hoistway change, etc.).

As noted, in some embodiments, automatic initiation may be implemented in some embodiments. In some such embodiments, the automatic initiation may be based on a schedule, such as daily, weekly, etc. Further, in some embodiments, the schedule may be set to have the door interlock check sequence occur at the same time each day to ensure a consistent lighting during such process. Further, in some embodiments, if an error occurs with respect to door operation is detected, such as by another elevator monitoring system, such error detection may prompt initiation of the door interlock check sequence. Various other automatic processes and implementations may be employed without departing from the scope of the present disclosure, and the above description is provided for illustrative and example purposes.

In some embodiments, the initiation of the door interlock check sequence may include changing the operational mode of the elevator system. For example, normal operation may be a mode of operation of the elevator system for use by passengers. In such normal operation, an elevator car may be called to a landing through operation of buttons or other call elements at a landing, and the elevator car may be operated to travel to different landings based on requests made by passengers within the elevator car. However, when the door interlock check sequence is initiated, the elevator system may be transitioned into a maintenance mode of operation. In the maintenance mode of operation, the movements and operation of the elevator car may be limited to prevent injury to users during the maintenance mode of operation (e.g., travel speed may be adjusted, ability to open the car doors or landing doors, etc., as will be appreciated by those of skill in the art). In some embodiments, the elevator system may be required to be entered into the maintenance mode of operation prior to initiation of the door interlock check sequence. In some embodiments, rather than entering a maintenance mode of operation, the process may be performed during normal operation.

At block 304, the inspection sequence is performed. The inspection sequence comprises moving the elevator along the elevator shaft to one or more landings, and in some embodiments each landing along the elevator shaft. In one non-limiting inspection sequence (or operation), the elevator car may be moved to each landing and the interlock devices of the elevator car and the landings may be engaged and operated. In another inspection sequence, the elevator car may be moved continuously along the elevator shaft, without stopping at any landings. In other embodiments, the elevator car may be moved to one or more specific landings, and the interlock devices may engage and operate. The operation of the interlock devices, as noted above, comprises an engagement between an elevator car door interlock device and a landing door interlock device. The engagement may enable opening and/or closing of the doors of the elevator system, at the specific landing (e.g., landing doors and elevator car doors). In some embodiments where a maintenance mode of operation is not employed, the inspection sequence may include capturing images whenever an elevator car stops at each landing during normal operation. Further still, in some embodiments, the inspection sequence is performed entirely during normal operation of the elevator.

At block 306, during the inspection sequence, a detector is arranged to capture images and/or video ("inspection data") associated with operation of the interlock devices. The detector may be a camera, a visual/optical detector (e.g., laser scanners, 2-D depth sensors, 3-D imagers, etc.), or other image/video capture device. The detector is mounted and angled such that as the elevator car moves through the elevator shaft, the detector can observe or capture images/video of the interlock devices and the interaction therebetween. As an example of one type of observation, the detector may monitor a spacing, gap, or clearance between the elevator car door interlock device and the landing door interlock device as the elevator car travels between elevator landings. For example, with a blade/vane and roller configuration, the detector may monitor a gap between the blade/vane as it travels between the rollers (e.g., when traveling between different landings of an elevator shaft). The gap and/or images/video of the gap may form the inspection data or a portion thereof. Further, the detector may measure or monitor the same gap when the elevator car stops at a particular landing. In another type of observation, the detector may capture images/video of the engagement between the interlock devices during operation of the elevator system doors. An amount of contact or contact surface or area between the interlock devices may be detected and captured as inspection data or a portion thereof At block 308, the inspection data is transmitted to an inspection device, such as a user device. In some embodiments the inspection device that receives the inspection data may be the same device used to initiate the door interlock check sequence of block 302. In some embodiments, the inspection device may be used to display captured images and/or video from the detector on a display or screen for viewing by a user. In some embodiments, the inspection device may be a computing system that processes the inspection data. For example, the inspection data may be transmitted to a computing system that analyzes the data. The analysis may be performed to automatically detect or monitor for various thresholds or criteria associated with performance and/or operation of the interlock devices.

After analysis of the inspection data is performed, whether automated or manually, a maintenance operation may be performed, if necessary. However, such maintenance operations may be avoided if the door interlock check sequence and flow process 300 described above indicates that no maintenance is necessary. In some embodiments, the analysis may be performed locally (e.g., on or at the detector), and thus, in some embodiments, a transmitting step may be omitted.

Figure 3B:
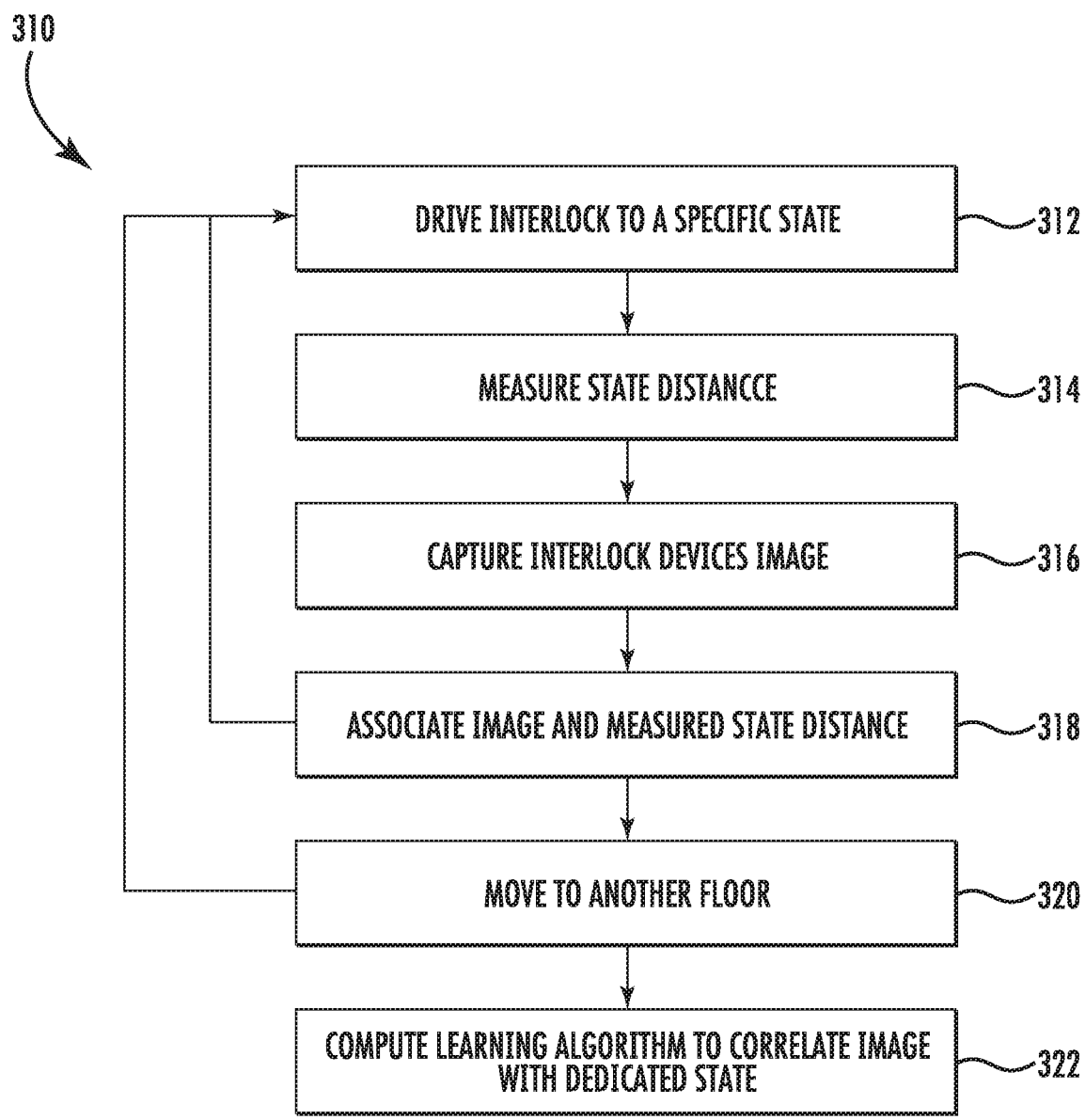
FIG. 3B is a flow process for building an interlock device state database of an elevator system in accordance with an embodiment of the present disclosure.

Turning now to FIG. 3B, a flow process 310 for building a database of interlock device states of an elevator system in accordance with an embodiment of the present disclosure is shown. The goal of building a database of interlock device states is to enable correlation between live/captured door interlock images with a physical state of operation. The flow process 310 may be performed with elevator systems as shown and described above, or variations thereon. The elevator system that may be operated in accordance with flow process 310 includes a detector (e.g., a camera) arranged to monitor the interlock devices of an elevator car and interlock devices at landings along an elevator shaft of the elevator system. In some embodiments, the flow process 310 may be performed partly or completely through a distributed computing network that is in communication with the elevator system. In some embodiments, a mobile device and/or mobile phone may be used to communicate through the distributed computing network to initiate and/or perform the various aspects of the flow process 310. In other embodiments, the flow process 310 may be performed onsite and as part of a maintenance routine or other programming or applications associated with the elevator system. Thus, the presently described flow process 310 is not limited to one specific application or method of execution, as will be appreciated by those of skill in the art.

At block 312, with the elevator car positioned at a specific landing, a door operator will drive a motor to achieve a known door interlock opening distance or specific state (e.g., contact, non-contact, full open distance, etc.). This is the first operation of building a door interlock database. The initiation of the building of the door interlock database may be performed at any number of locations/devices and typically would be initiated by a user (e.g., mechanic) although automated initiation may be implemented in accordance with some embodiments. In some non-limiting examples, a user may initiate the door interlock database building from a handheld device (e.g., mobile phone, tablet, dedicated handheld device, etc.) that can transmit a signal or instruction to an elevator controller to perform the building of the door interlock database. In some embodiments, the initiation may be started from an on-site, or off-site, computer system. Further, as noted, in some embodiments, the elevator controller, or an associated computing system, may be configured to initiate the door interlock image capture based on a schedule, specific event, or based on some other criteria.

In some embodiments, the initiation of the building of the door interlock database may include changing the operational mode of the elevator system. For example, normal operation may be a mode of operation of the elevator system for use by passengers. In such normal operation, an elevator car may be called to a landing through operation of buttons or other call elements at a landing, and the elevator car may be operated to travel to different landings based on requests made by passengers within the elevator car. However, when the sequence for the building of the door interlock database is initiated, the elevator system may be transitioned into a maintenance mode of operation. In the maintenance mode of operation, the movements and operation of the elevator car may be limited to prevent injury to users during the maintenance mode of operation (e.g., travel speed may be adjusted, ability to open the car doors or landing doors, etc., as will be appreciated by those of skill in the art). In some embodiments, the elevator system may be required to be entered into the maintenance mode of operation prior to initiation of the building of the door interlock database. In some embodiments, rather than entering a maintenance mode of operation, the process may be performed during normal operation.

At block 314, a door interlock state distance (e.g., opening distance) is measured. The measurement may be performed automatically (e.g., using a door motor rotary encoder) or manually (e.g., manual measurement using a ruler). The door interlock state distance is a measureable distance between elements of the door interlock (e.g., separation distance between a landing door interlock device and an elevator car door interlock device).

At block 316, an image of door interlock devices is captured using the detector (e.g., camera).

At block 318, the captured image form block 316 may be associated with the measured door interlock state distance obtained at block 314. The image is captured and stored on a memory associated with the detector and/or of the component inspection system. In some embodiments, multiple images may be stored into a test database to evaluate process efficiency. The association between the captured image and the measured state distance is also stored to build the door interlock database.

Blocks 312-318 may be repeated in order to map all opening positions to corresponding captured images. That is, different door interlock states may be engaged or operated for a single door interlock such that different distances and/or amounts of contact between two or more components of the door interlock are achieved. At each different state, an image may be captured and associated with a measured state distance. In some embodiments, different algorithms may be employed to avoid mechanical hysteresis effects (e.g., random positions, linear assignment, begin from greater opening distances, etc.).

At block 320, optionally, after a set of data is obtained at the first landing, the elevator car is moved to another floor in order to perform the same learning sequence (i.e., blocks 312-318 are repeated at one or more landings). It is noted that light can disturb image recognition and data collection, and thus floor environment has to be taken into account. This is why it may be necessary to perform the database learning sequence at each floor.

At block 322, a machine learning algorithm will correlate image with its corresponding state. Block 322 may be performed after each floor is measured and/or after the completion of measurement at all floors.

The flow process 310 may be repeated until a sufficient database is built. The database strength is evaluated using the test database. For example, as will be appreciated by those of skill in the art, if a required percentage of hidden cases contained into the test database is successfully evaluated, the door interlock database is sufficient to compute door interlock device states during normal operation or during an inspection operation (e.g., flow process 300 of FIG. 3A).

Figure 3C:
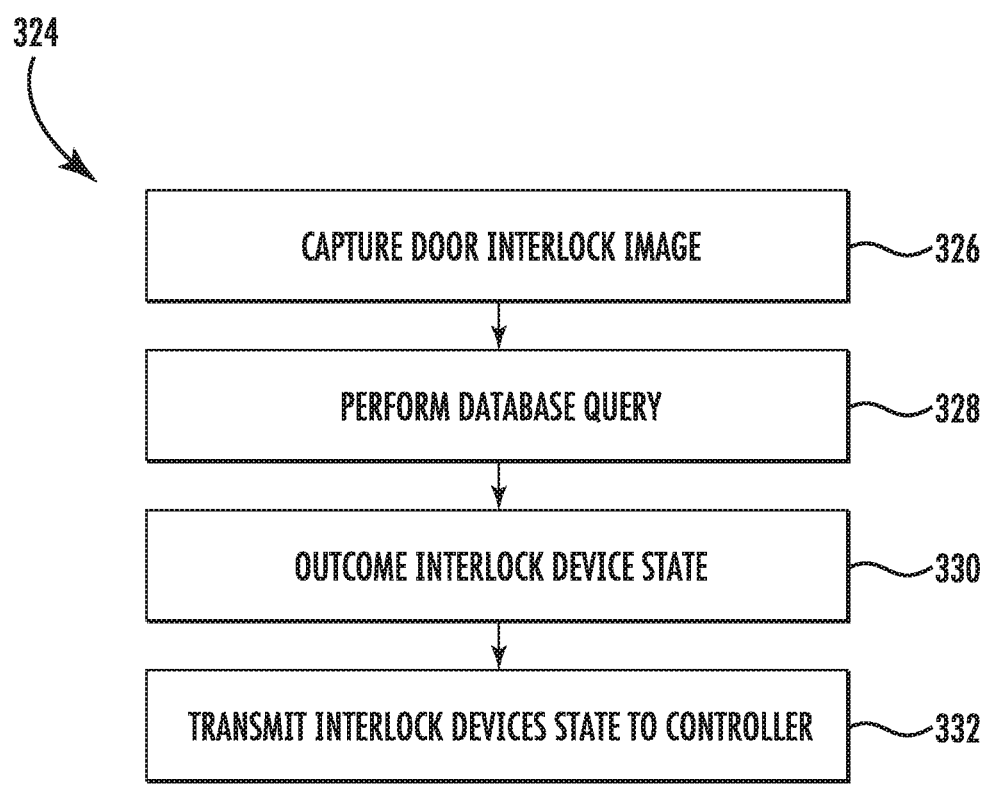
FIG. 3C is a flow process for performing interlock device state detection of an elevator system in accordance with an embodiment of the present disclosure

Turning now to FIG. 3C, a flow process 324 for performing detection of interlock device state of an elevator system in accordance with an embodiment of the present disclosure is shown. The flow process 324 may be performed with elevator systems as shown and described above, or variations thereon. The elevator system that may be operated in accordance with flow process 324 includes a detector arranged to monitor interlock devices of an elevator car and interlock devices at landings along an elevator shaft of the elevator system. In some embodiments, the flow process 324 may be performed partly or completely through a distributed computing network that is in communication with an elevator system. In some embodiments, a mobile device and/or mobile phone may be used to communicate through the distributed computing network to initiate and/or perform the various aspects of the flow process 324. In other embodiments, the flow process 324 may be performed onsite and as part of a maintenance routine or other programming or applications associated with an elevator system. Thus, the presently described flow process 324 is not limited to one specific application or method of execution, as will be appreciated by those of skill in the art.

At block 326, a detector (e.g., camera) captures an image of a door interlock (e.g., the components of a door interlock as they interact). The initiation of the door interlock image capture may be performed at any number of locations/devices and typically would be initiated by a user (e.g., mechanic) although automated initiation may be implemented in accordance with some embodiments. In some non-limiting examples, a user may initiate the door interlock image capture from a handheld device (e.g., mobile phone, tablet, dedicated handheld device, etc.) that can transmit a signal or instruction to an elevator controller to perform the door interlock image capture. In some embodiments, the initiation may be started from an on-site, or off-site, computer system. Further, as noted, in some embodiments, the elevator controller, or an associated computing system, may be configured to initiate the door interlock image capture based on a schedule, specific event, or based on some other criteria.

At block 328, the door interlock detection algorithm is performed by querying a previously built database (e.g., door interlock database generated using flow process 310 of FIG. 3B). The query may be performed and a comparison of the captured image against database information (e.g., prior images, detected distances, etc.) may be performed.

At block 330, an output from the query of block 328 maybe generated. The output at block 330 may indicate a state of the interlock devices that are captured in the image of block 326. That is, a detected state of the imaged interlock devices may be generated from the query and output as a state of the interlock device (e.g., in compliance with normal operation or outside of normal operation parameters).

At block 332, the interlock state of block 330 may be transmitted to an elevator controller or other remote computing system. In some embodiments, the inspection device may be used to display captured images and/or video from the detector on a display or screen for viewing by a user. Further, in some embodiments, if an error or issue with outside of normal operation is detected, a notification, alert, or alarm may be generated by the computing system (e.g., in the form of a transmitted message).

Figure 4A:
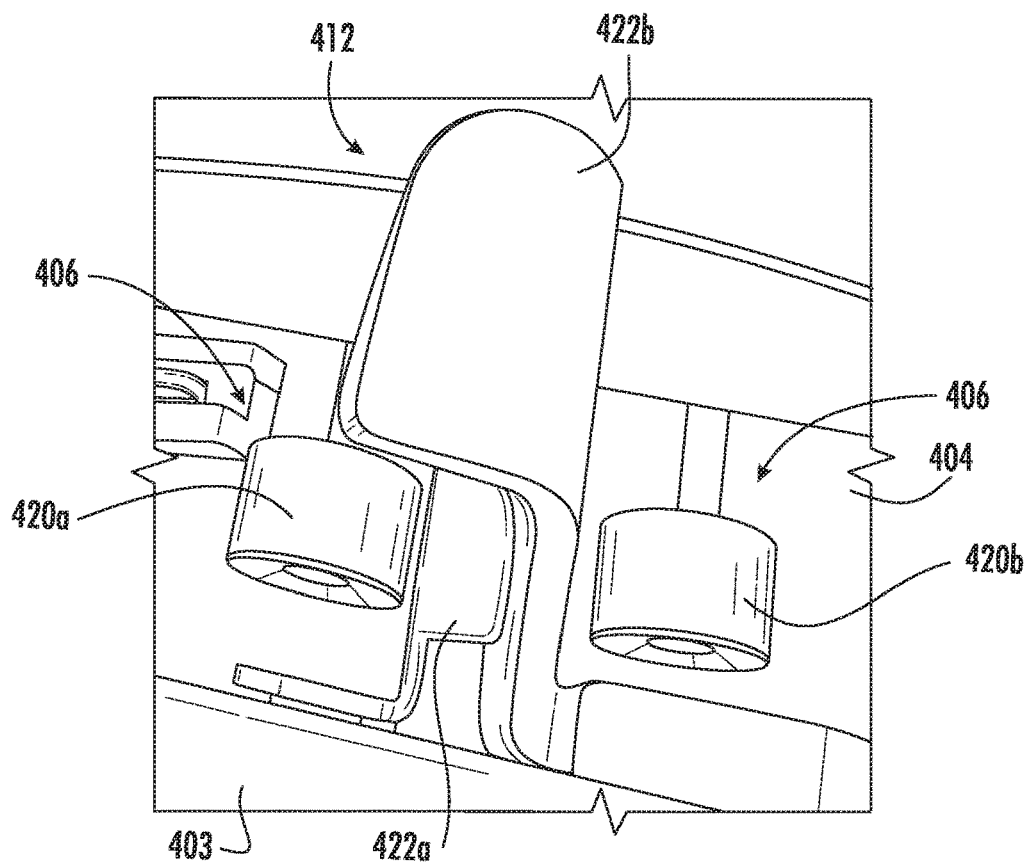
FIG. 4A is an isometric illustration of a landing door interlock device and an elevator car door interlock device positioned adjacent thereto in accordance with an embodiment of the present disclosure.
Figure 4B:
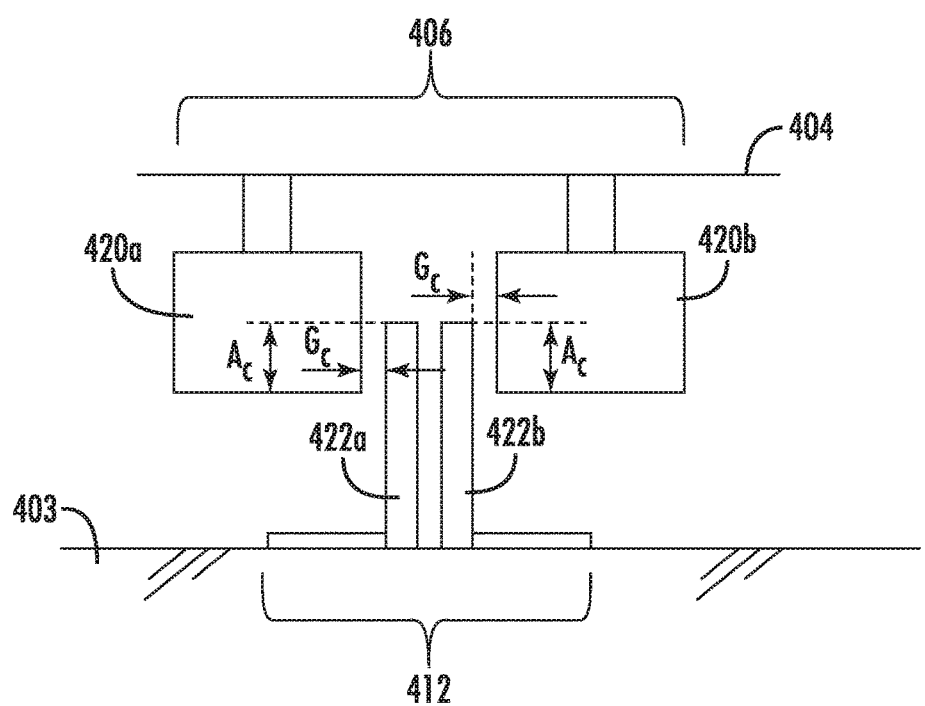
FIG. 4B is a top down plan view illustration of the interlock devices shown in FIG. 4A.

Turning now to FIGS. 4A-4B, schematic illustrations of interlock devices of an elevator system that may be observed by a detector of the present disclosure are shown. FIG. 4A is an isometric illustration of a landing door interlock device 406 and an elevator car door interlock device 412 positioned adjacent thereto and arranged to enable coupling or engagement therebetween during a door opening/closing operation. FIG. 4B is a top down plan view illustration of the interlock devices 406, 412.

As shown, in this example embodiment, the landing door interlock device 406 includes a first element 420a and a second element 420b. In this arrangement, the first and second elements 420a, 420b of the landing door interlock device 406 are rollers, as will be appreciated by those of skill in the art. The landing door interlock device 406 is mounted to a landing door lintel 404, similar to that shown and described above and as appreciated by those of skill in the art.

The elevator car door interlock device 412 of this embodiment includes a first element 422a and a second element 422b. The first and second elements 422a, 422b of the elevator car door interlock device 412, in this embodiment, are configured as blades or vanes. The elevator car door interlock device 412 is mounted to an elevator car 403, similar to that shown and described above and as appreciated by those of skill in the art.

When the elevator car 403 travels along an elevator shaft, the elevator car door interlock device 412 will move through and between the elements 420a, 420b of the landing door interlock device 406. That is, the elements of the interlock devices 406, 412 will not contact each other and movement of the elevator car 403 will not be impaired. To ensure no contact occurs, a minimum clearance gap $G_c$ must be maintained. A minimum clearance gap $G_c$ is present between the first element 420a of the landing door interlock device 406 and the first element 422a of the elevator car door interlock device 412, as shown in FIG. 4B. A minimum clearance gap $G_c$ is present between the second element 420b of the landing door interlock device 406 and the second element 422b of the elevator car door interlock device 412, as shown in FIG. 4B. A detector may be arranged to monitor and/or capture images/video of the minimum clearance gap $G_c$ as the elevator car 403 moves along the elevator shaft. If the detected gap is less than the minimum clearance gap $G_c$ (i.e., one of the elements of the elevator car door interlock device 412 is closer to a respective element of the landing door interlock device 406 than the minimum clearance gap $G_c$), then maintenance may be required. In some embodiments, the minimum clearance gap $G_c$ is a gap of at least 1 mm, and in some embodiments, the minimum clearance gap $G_c$ may be established within a range, such as 1 to 4 mm, or even 2 to 3 mm. In some such embodiments, rather than being a minimum threshold, the system may monitor to ensure that the observed or measured clearance is within a predefined range.

When the landing door interlock device 406 and the elevator car door interlock device 412 engage to open elevator doors, a minimum area of contact $A_c$ should be provided between the elements 420a, 420b of the landing door interlock device 406 and the elements 422a, 422b of the elevator car door interlock device 412. The minimum area of contact $A_c$ represents a contact surface between the various elements and ensures sufficient contact and transfer of forces to enable the proper operation of the elevator doors. Accordingly, a detector (e.g., the same detector described above to monitor the minimum clearance gap $G_c$) may be arranged to monitor (e.g., image/video) the amount of contact between the elements 420a, 420b of the landing door interlock device 406 and the elements 422a, 422b of the elevator car door interlock device 412 to ensure the minimum area of contact $A_c$ is present during operation of the elevator doors. If the minimum area of contact $A_c$ is not present (i.e., less contact is made), then maintenance may be required. In some non-limiting embodiments, the minimum area of contact $A_c$ is at least 50% of the elements 422a, 422b of the elevator car door interlock device 412 is contacted by the respective elements 420a, 420b of the landing door interlock device 406.

Figure 5:
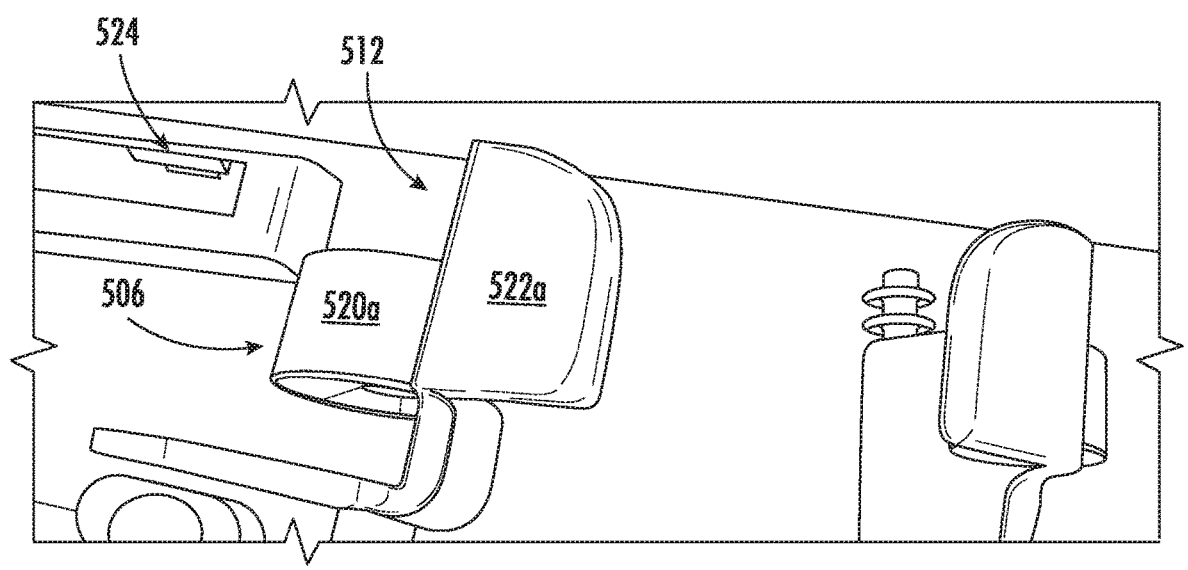
FIG. 5 is a schematic illustration of interlock devices arranged in accordance with an embodiment of the present disclosure.

Turning now to FIG. 5, another indicator for inspection or observation by a detector in accordance with an embodiment of the present disclosure is illustratively shown. As shown in FIG. 5, a landing door interlock device 506 and an elevator car door interlock device 512 are positioned relative to each other. In this illustration, a first element 520a of the landing door interlock device 506 is engaged with a first element 522a of the elevator car door interlock device 512. The arrangement shown in FIG. 5 is representative of when elevator doors are opened. As shown, a marker 524 is arranged relative to the interlock devices 506, 512, and particularly adjacent to the landing door interlock device 506. The marker 524 is arranged to only be visible when the interlock devices 506, 512 have operated to open an elevator door. If the marker is visible when the elevator doors are closed, then maintenance may be required. It should be appreciated that in some embodiments, the opposite arrangement may be employed, wherein the marker is visible during normal operation, and the absence of the marker may be indicative of required maintenance.

As noted above, the inspection of the various components and areas of interest may be performed automatically. For example, during installation and setup of the elevator system, the various thresholds (e.g., minimum clearance gap $G_c$, minimum area of contact $A_c$, and detection of a marker) may be set within an inspection computing system that is part of or associated with a specific elevator system and/or elevator controller. The detector of the systems may be arranged with a computing system to perform analysis on inspection data as it is collected (or performed on stored inspection data). The analysis may be arranged to detect spacing and/or gaps to measure the various clearances, contact areas, and/or presence of a marker. If a given threshold is exceeded or criteria is met, a signal or notification can be generated to notify an operator or maintenance person that a maintenance operation and/or manual inspection may be required.

Figure 6:
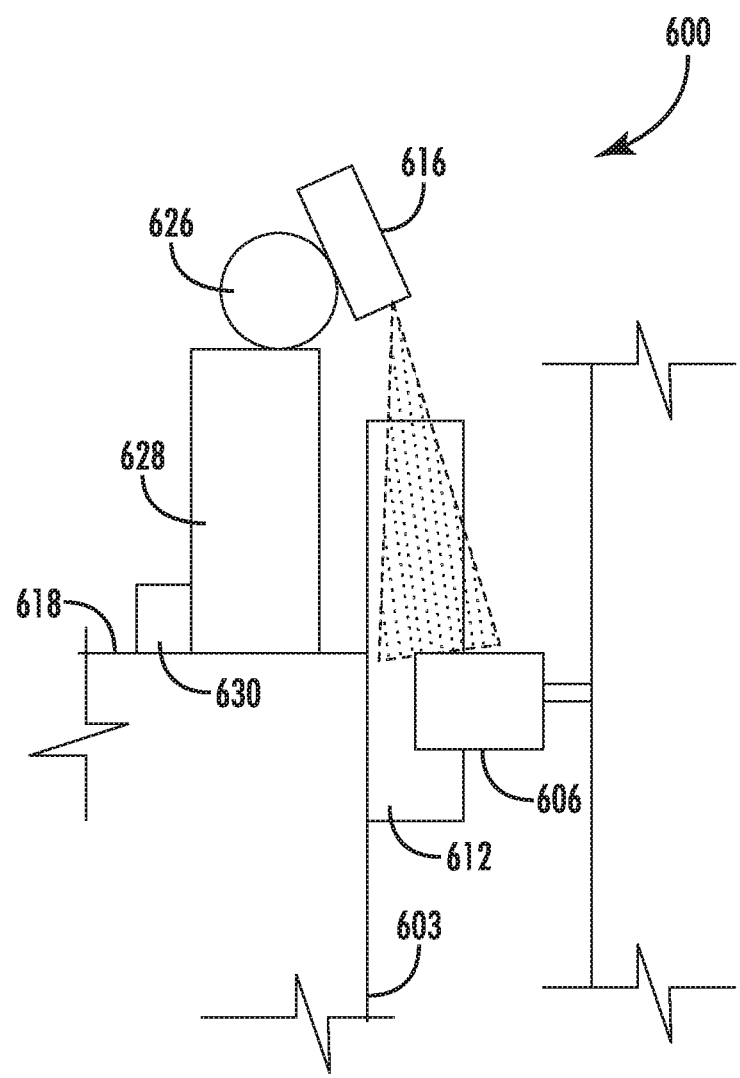
FIG. 6 is a schematic illustration of a component inspection system in accordance with an embodiment of the present disclosure.

Turning now to FIG. 6, a side view schematic illustration of a component inspection system 600 in accordance with an embodiment of the present disclosure is shown. The component inspection system 600 includes a detector 616 mounted to a top 618 of an elevator car 603. As shown, the detector 616 is arranged to capture images or video of interlock devices 606, 612 (e.g., a landing door interlock device 606 and an elevator car door interlock device 612). The detector 616 is a camera or other image/video capture device that is mounted on a pivot 626 which in turn is pivotably affixed to a mounting frame 628. In some embodiments, the pivot 626 and/or the mounting frame 628 may be omitted, and the detector 616 may be directly affixed, attached, or otherwise mounted to the mounting frame 628.

The detector 616 is positioned so that the detector does not extend too far over an edge of the top 618 of the elevator car 603, and thus does not interfere with operation of the elevator car 603. For example, the detector may be arranged or positioned at "hoistway clear," as will be appreciated by those of skill in the art. Hoistway clear, as used herein, means a position wherein no part of the detector will contact a hoistway wall or fixed components of the elevator system within the elevator shaft.

As shown in FIG. 6, the component inspection system 600 may include a control unit 630. The control unit 630 can provide automated control and/or processing onboard with the component inspection system 600. The control unit 630 can provide processor-implemented operation for practicing embodiments of the present disclosure. As such, the control unit 630 can include a processor and associated storage (e.g., memory). In some embodiments, computer program code containing instructions may be embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

In some embodiments, the control unit 630 can be connected to a network and able to transmit and/or receive data therefrom. In some such embodiments, the control unit 630 may be operably connected to a distributed computing network and in other embodiments may be connected to a local network. It will be appreciated that the control unit 630 may be located locally and/or remote, and thus the illustrative position is not to be limiting, but rather is shown for example and illustrative purposes.

The control unit 630 is configured to control operation of the detector 616 to monitor and capture images or video of interlock devices 606, 612. The control unit 630 may process data collected by the detector 616. In one non-limiting embodiments, the control unit 630 includes an artificial intelligence program installed or operable thereon. The program is arranged to compare captured images with pre-set or pre-existing images to determine if operation of the interlock devices 606, 612 is proper or not. That is, in some embodiments, the control unit 630 may compare inspection data collected by the detector 616 against predetermined data, such as prior images or data used for machine learning.

In some embodiments, machine learning may be employed such that the control unit 630 is taught using prior or pre-existing open and/or close coupling images and subsequently establish the various thresholds (e.g., minimum clearance gap $G_c$, minimum area of contact $A_c$, and detection of a marker) described above. The control unit 630 may, in some embodiments, compute a coupling position based on machine learning of different states of coupling, for example: fully open, quarter close, half close, three-quarter close, fully close. Moreover, in some embodiments, the control unit 630 may be configured to recognize or identify the presence of obstacles to coupling close or open operations of the interlock devices 606, 612. In the event of detection of an obstacle obstructing operation of the interlock devices 606, 612, elevator system may be operated to try to remove the obstacle by opening and closing the interlock devices 606, 612 several times at different speeds. If cleaning procedure is unsuccessful, the control unit 630 may be programmed to generate a call or notification to initiate a maintenance operation to be performed by a technician.

As shown in FIG. 6, the control unit 630 is configured with the other elements of the component inspection system 600. However, such compact or discrete system is not to be limiting. For example, in some embodiments, the functionality of the control unit 630, described above, may be implemented in or on a general elevator controller or control unit (e.g., controller 115 shown in FIG. 1). Further, in some embodiments, the control unit may be located remote from the specific elevator system being monitored. For example, in some embodiments, a general purpose computer or other computing system located in a building housing the elevator system may perform the analyzing of data/images collected by the detector 616. Further, as noted above, in some embodiments the processing may be performed through a distributed computing system (e.g., cloud-based computing). Thus, the present disclosure is not to be limiting, but rather is provided for example and illustrative purposes.

Advantageously, embodiments described herein provide for inspection of elevator components, such as interlock devices, thus potentially eliminating the need for a mechanic to enter an elevator shaft to perform the inspection. In embodiments that are fully automated, embodiments provided herein can reduce onsite maintenance time. Further, even with onsite personnel, remote observation and inspection may significantly reduce maintenance time and eliminate in-person, manual inspection at each landing of an elevator system. Further, advantageously, in some embodiments, a visit by personnel may be completely eliminated.

Further, advantageously, embodiments described herein provide for an automated processing and analysis such that manual inspection may be avoided. In some such examples, if the predetermined proper operating conditions are not met, a control unit or other associated processing/computing system may generate a notification, alarm, or warning that may notify an operator or other maintenance personnel of a coupling/interlock system that is outside of normal operating conditions.

For example, in some embodiments, the control unit of the component inspection system may generate a notification, alarm, or warning when it is detected that one or more thresholds (e.g., minimum clearance gap $G_c$, minimum area of contact $A_c$, and detection of a marker) are exceeded or outside of normal operating criteria.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An elevator system comprising:
an elevator car movable within an elevator shaft, the elevator car includes an elevator car door interlock device arranged on a top of the elevator car and operable to open and close elevator car doors;
a plurality of landing doors located at respective landings along the elevator shaft, wherein each landing door includes a landing door interlock device operable to open and close a respective landing door, wherein each landing door interlock device is engageable by the elevator car door interlock device to enable operation of the elevator car doors and the respective landing door simultaneously; and
an elevator component inspection system comprising a detector located on the top of the elevator car and arranged to monitor the elevator car door interlock device and the plurality of landing door interlock devices, wherein the detector obtains inspection data associated with the elevator car door interlock device and the plurality of landing door interlock devices, and a control unit configured to analyze the inspection data wherein the component inspection system:
captures images of the elevator car door interlock device and landing door interlock device using the detector;
performs a database inquiry comparing the captured image against a database of interlock device states; and
determines a state of the elevator car door interlock device and landing door interlock device based on one or more thresholds.

2. The elevator system of claim 1, wherein the control unit performs machine learning to learn at least one of the one or more thresholds.

3. The elevator system of claim 1, wherein the one or more thresholds comprises a minimum area of contact between the landing door interlock device and at least one landing door interlock device, and wherein the threshold is exceeded when the inspection data indicates that less than the minimum area of contact is made between the landing door interlock device and the at least one landing door interlock device, in particular, wherein the minimum area of contact is at least 50% of the elevator car door interlock device is contacted by a respective element of the landing door interlock device.

4. The elevator system of claim 1, wherein the one or more thresholds comprises a minimum clearance gap between the landing door interlock device and at least one landing door interlock device, and wherein the threshold is exceeded when the inspection data indicates that a detected clearance gap exceeds the minimum clearance gap, particularly, wherein the minimum clearance gap is a spacing between 1 and 4 mm.

5. The elevator system of claim 1, wherein the one or more thresholds comprises a detected presence of a marker when the landing door interlock device and at least one landing door interlock device are in a closed position, and wherein the threshold is exceeded when the presence of the marker is detected.

6. The elevator system of claim 1, wherein each landing door interlock device comprises a pair of rollers and the elevator car door interlock device comprises at least one of a set of vanes and a set of blades.

7. The elevator system of claim 1, further comprising transmitting the state of the interlock devices to a remote computing system.

8. A method for inspecting components an elevator system, the method comprising:
performing machine learning to program a control unit to detect one or more thresholds of operation of an elevator door interlock;
initiating a door interlock check sequence of an elevator system having an elevator car movable within an elevator shaft, the elevator car includes an elevator car door interlock device arranged on a top of the elevator car and operable to open and close elevator car doors and a plurality of landing doors located at respective landings along the elevator shaft, wherein each landing door includes a landing door interlock device operable to open and close a respective landing door, wherein each landing door interlock device is engageable by the elevator car door interlock device to enable operation of the elevator car doors and the respective landing door simultaneously;
performing an inspection sequence with an elevator component inspection system comprising a detector located on the top of the elevator car and arranged to monitor the elevator car door interlock device and the plurality of landing door interlock devices;
capturing inspection data with the detector, the inspection data associated with the elevator car door interlock device and the plurality of landing door interlock devices; and comparing, with the control unit, the inspection data against predetermined data to determine when at least one threshold of the one or more thresholds is exceeded.

9. The method of claim 8, further comprising:
analyzing the inspection data;
determining if the inspection data indicates a threshold of the one or more thresholds is exceeded; and
generating a notification when the threshold of the one or more thresholds is exceeded.

10. The method of claim 8, wherein one threshold of the one or more thresholds comprises a minimum area of contact between the landing door interlock device and at least one landing door interlock device, and wherein the threshold is exceeded when the inspection data indicates that less than the minimum area of contact is made between the landing door interlock device and the at least one landing door interlock device, particularly, wherein the minimum area of contact is at least 50% of the elevator car door interlock device is contacted by a respective element of the landing door interlock device.

11. The method of claim 8, wherein one threshold of the one or more thresholds comprises a minimum clearance gap between the landing door interlock device and at least one landing door interlock device, and wherein the threshold is exceeded when the inspection data indicates that a detected clearance gap exceeds the minimum clearance gap, particularly, wherein the minimum clearance gap is a spacing between 1 and 4 mm.

12. The method of claim 8, further comprising detecting a marker, wherein the inspection data comprises a detected presence of the marker when the landing door interlock device and at least one landing door interlock device are in a closed position, and wherein a threshold of the one or more thresholds is exceeded when the presence of the marker is detected.

13. The method of claim 8, further comprising generating an interlock device state database and querying the interlock device state database to determine if a threshold of the one or more thresholds is exceeded.

14. The method of claim 8, further comprising transmitting the inspection data to at least one of a mobile device, a remote device, a distributed computing system, and an elevator controller.

15. The method of claim 14, further comprising processing the inspection data on the at least one of a mobile device, a remote device, a distributed computing system, and an elevator controller.

16. The method of claim 9, further comprising detecting a marker, wherein the inspection data comprises a detected presence of the marker when the landing door interlock device and at least one landing door interlock device are in a closed position, and wherein the threshold is exceeded when the presence of the marker is detected.

17. The method of claim 9, further comprising generating a interlock device state database and querying the interlock device state database to determine if a threshold of the one or more thresholds is exceeded.

18. The method of claim 9, further comprising transmitting the inspection data to at least one of a mobile device, a remote device, a distributed computing system, and an elevator controller.

19. The elevator system of claim 2, wherein each landing door interlock device comprises a pair of rollers and the elevator car door interlock device comprises at least one of a set of vanes and a set of blades.

20. The elevator system of claim 2, further comprising transmitting the state of the interlock devices to a remote computing system.

\* \* \* \* \*